(12) United States Patent
Chen et al.

(10) Patent No.: US 12,498,536 B2
(45) Date of Patent: *Dec. 16, 2025

(54) OPTICAL ELEMENT DRIVING MECHANISM

(71) Applicant: TDK CORPORATION, Tokyo (JP)

(72) Inventors: Shu-Shan Chen, Taoyuan (TW);
Chao-Chang Hu, Taoyuan (TW);
Pai-Jui Cheng, Taoyuan (TW);
Hsiao-Hsin Hu, Taoyuan (TW);
Chieh-An Chang, Taoyuan (TW)

(73) Assignee: TDK CORPORATION, Tokyo (JP)

( * ) Notice: Subject to any disclaimer, the term of this patent is extended or adjusted under 35 U.S.C. 154(b) by 375 days.

This patent is subject to a terminal disclaimer.

(21) Appl. No.: 18/151,859

(22) Filed: Jan. 9, 2023

(65) Prior Publication Data

US 2023/0225211 A1  Jul. 13, 2023

Related U.S. Application Data

(60) Provisional application No. 63/266,570, filed on Jan. 7, 2022.

(51) Int. Cl.
| | |
|---|---|
| *G02B 7/08* | (2021.01) |
| *G02B 13/00* | (2006.01) |
| *G02B 27/64* | (2006.01) |
| *G03B 17/12* | (2021.01) |
| *H10N 30/03* | (2023.01) |
| *H10N 30/30* | (2023.01) |

(Continued)

(52) U.S. Cl.
CPC ............ *G02B 7/08* (2013.01); *G02B 13/001* (2013.01); *G02B 27/646* (2013.01); *G03B 17/12* (2013.01); *H10N 30/03* (2023.02); *H10N 30/302* (2023.02); *H10N 30/802* (2023.02); *H10N 30/85* (2023.02)

(58) Field of Classification Search
CPC .. G02B 7/02–105; G02B 7/18; G02B 7/1805; G02B 7/182; H10N 30/85
See application file for complete search history.

(56) References Cited

U.S. PATENT DOCUMENTS

| | | | |
|---|---|---|---|
| 8,682,150 B2 * | 3/2014 | Hosokawa | G03B 17/12 |
| | | | 348/208.11 |
| 9,989,779 B2 * | 6/2018 | Ichihashi | G02B 7/04 |
| 10,423,005 B2 * | 9/2019 | Hu | G02B 27/646 |

(Continued)

FOREIGN PATENT DOCUMENTS

| | | | |
|---|---|---|---|
| CN | 215340561 | 12/2021 | |
| EP | 675589 B1 * | 8/2001 | G02B 7/08 |

OTHER PUBLICATIONS

Hu et al. U.S. Appl. No. 17/541,726, filed Dec. 3, 2021 (Year: 2021).*

(Continued)

*Primary Examiner* — Cara E Rakowski
(74) *Attorney, Agent, or Firm* — MUNCY, GEISSLER, OLDS & LOWE, P.C.

(57) ABSTRACT

An optical element driving mechanism is provided and includes a fixed assembly, a movable assembly, and a driving assembly. The movable assembly is configured to be connected to an optical element and is movable relative to the fixed assembly. The driving assembly is configured to drive the movable assembly to move along a first axis relative to the fixed assembly.

18 Claims, 13 Drawing Sheets

(51) Int. Cl.
*H10N 30/80* (2023.01)
*H10N 30/85* (2023.01)

(56) References Cited

U.S. PATENT DOCUMENTS

| | | | |
|---|---|---|---|
| 10,935,809 B2* | 3/2021 | Hu | G02B 7/09 |
| 11,002,941 B2* | 5/2021 | Cheng | H04N 23/54 |
| 11,175,475 B2* | 11/2021 | Hu | G02B 7/023 |
| 11,187,965 B2* | 11/2021 | Hu | H04N 23/54 |
| 11,226,466 B2* | 1/2022 | Wang | G03B 5/00 |
| 11,226,469 B2* | 1/2022 | Fan | G02B 27/646 |
| 11,333,847 B2* | 5/2022 | Hu | G03B 3/10 |
| 11,402,603 B2* | 8/2022 | Yu | G02B 7/09 |
| 11,409,069 B2* | 8/2022 | Hu | G02B 7/1805 |
| 11,428,949 B2* | 8/2022 | Hu | G02B 7/08 |
| 11,448,852 B2* | 9/2022 | Hu | G02B 7/04 |
| 11,630,282 B2* | 4/2023 | Chen | G02B 7/08 359/823 |
| 11,693,212 B2* | 7/2023 | Ichihashi | G02B 13/001 359/824 |
| 11,693,293 B2* | 7/2023 | Wang | G02B 7/04 348/335 |
| 11,693,296 B2* | 7/2023 | Wang | G02B 27/646 359/823 |
| 11,815,736 B2* | 11/2023 | Hu | G02B 7/10 |
| 11,860,443 B2* | 1/2024 | Hu | G02B 7/08 |
| 11,880,090 B2* | 1/2024 | Hu | G03B 5/02 |
| 11,899,274 B2* | 2/2024 | Hu | G02B 7/09 |
| 12,153,336 B2* | 11/2024 | Wang | G03B 11/043 |
| 12,222,576 B2* | 2/2025 | Hu | G02B 7/1805 |
| 2007/0035210 A1* | 2/2007 | Sasaki | H02N 2/025 310/329 |
| 2007/0229702 A1* | 10/2007 | Shirono | G02B 13/009 348/374 |
| 2008/0088946 A1* | 4/2008 | Hu | G02B 7/102 359/696 |
| 2014/0293461 A1* | 10/2014 | Nakamura | G02B 7/023 359/822 |
| 2018/0224631 A1* | 8/2018 | Ichihashi | G02B 47/22 |
| 2022/0357556 A1* | 11/2022 | Hsiao | G02B 7/022 |

OTHER PUBLICATIONS

Chen et al. U.S. Appl. No. 17/970,884, filed Oct. 21, 2022 (Year: 2022).*
Cheng et al. U.S. Appl. No. 17/739,761, filed May 9, 2022 (Year: 2022).*
Hsiao et al. U.S. Appl. No. 17/739,380, filed May 9, 2022 (Year: 2022).*
Zhuang et al. U.S. Appl. No. 18/521,536, filed Nov. 28, 2023 (Year: 2023).*
Hu et al. U.S. Appl. No. 18/180,388, filed Mar. 8, 2023 (Year: 2023).*
Hu et al. U.S. Appl. No. 18/500,679, filed Nov. 2, 2023 (Year: 2023).*
Hu et al. U.S. Appl. No. 18/481,473, filed Oct. 5, 2023 (Year: 2023).*
Hu et al. U.S. Appl. No. 18/481,455, filed Oct. 5, 2023 (Year: 2023).*
Cheng et al. U.S. Appl. No. 18/156,132, filed Jan. 18, 2023 (Year: 2023).*
Chen et al. U.S. Appl. No. 18/151,817, filed Jan. 9, 2023 (Year: 2023).*
Meng et al. U.S. Appl. No. 18/894,733, filed Sep. 24, 2024 (Year: 2024).*
Meng et al. U.S. Appl. No. 18/895,950, filed Sep. 25, 2024 (Year: 2024).*
Zhaung et al. U.S. Appl. No. 18/768,209, filed Jul. 10, 2024 (Year: 2024).*
Chao et al. U.S. Appl. No. 18/756,858, filed Jun. 27, 2024 (Year: 2024).*
Ke et al. U.S. Appl. No. 18/735,553, filed Jun. 6, 2024 (Year: 2024).*
Wu et al. U.S. Appl. No. 18/628,081, filed Apr. 5, 2024 (Year: 2024).*
Wu et al. U.S. Appl. No. 18/436,398, filed Feb. 8, 2024 (Year: 2024).*
Hu et al. U.S. Appl. No. 18/404,559, filed Jan. 4, 2024 (Year: 2024).*
An Office Action in corresponding CN Application No. 202320041667.0 dated May 17, 2023 is attached, 1 page.

* cited by examiner

OPTICAL ELEMENT DRIVING MECHANISM

CROSS REFERENCE TO RELATED APPLICATIONS

This application claims the benefit of U.S. Provisional Application No. 63/266,570, filed on Jan. 7, 2022, the entirety of which is incorporated by reference herein.

BACKGROUND OF THE INVENTION

Field of the Invention

The present disclosure relates to an optical element driving mechanism, and in particular it relates to an optical element driving mechanism having a piezoelectric element.

Description of the Related Art

As technology has developed, it has become more common to include image-capturing and video-recording functions into many types of modern electronic devices, such as smartphones and digital cameras. These electronic devices are used more and more often, and new models have been developed that are more convenient, thin, and lightweight, offering more choices for consumers.

BRIEF SUMMARY OF THE INVENTION

According to some embodiments of the disclosure, the present disclosure provides an optical element driving mechanism that includes a fixed assembly, a movable assembly, and a driving assembly. The movable assembly is configured to be connected to an optical element and is movable relative to the fixed assembly. The driving assembly is configured to drive the movable assembly to move along a first axis relative to the fixed assembly.

According to some embodiments, the movable assembly includes a movable part. The drive assembly includes a piezoelectric assembly configured to drive the movable part. The piezoelectric assembly is fixedly disposed on the fixed assembly, and the piezoelectric assembly includes a counterweight, a piezoelectric element and a driving member. The piezoelectric element is fixedly connected between the counterweight and the driving member. The driving member has a long strip-shaped structure extending along the first axis. The driving member is made of a carbon material. The movable assembly further includes at least two holding elements. The at least two holding elements and the driving member are disposed in a central opening of the movable part. The at least two holding elements are configured to hold the driving member. The at least two holding elements are made of metal. The piezoelectric element is configured to generate a vibration so that a friction force is generated between the driving member and the at least two holding elements to drive the movable part to move.

According to some embodiments, the at least two holding elements include a first holding element and a second holding element. The first holding element and the second holding element are made of metal. When viewed along the first axis, the first holding element has a plate-shaped structure extending along a second axis. The second axis is perpendicular to the first axis. Both ends of the first holding element are embedded in the movable part. When viewed along the first axis, the second holding element has a V-shaped structure.

According to some embodiments, the second holding element has a first end portion, a first connecting portion, a second connecting portion and a second end portion. The first connecting portion is connected between the first end portion and the second connecting portion. The second connecting portion is connected between the first connecting portion and the second end portion. The first end portion and the second end portion extend along a third axis. The third axis is perpendicular to the second axis and the first axis. Extending directions of the first connecting portion and the second connecting portion are not parallel to the second axis and the third axis. The first holding element, the first connecting portion and the second connecting portion are configured to be in contact with the driving member to hold the driving member together.

According to some embodiments, the movable part forms a first V-shaped groove and a second V-shaped groove which are connected to the central opening and configured to accommodate the first end portion and the second end portion respectively. A plurality of slope structures are formed in the first V-shaped groove and the second V-shaped groove and are configured to guide the corresponding first connecting portion and second connecting portion. The optical element driving mechanism further includes a first adhesive element and a second adhesive element respectively disposed in the first V-shaped groove and the second V-shaped groove, configured to fix the first end portion and the second end portion.

According to some embodiments, the first V-shaped groove has a first accommodating portion and a second accommodating portion. The slope structures are formed between the first accommodating portion and the second accommodating portion. When the second holding element is disposed in the first V-shaped groove, the second holding element does not protrude from the first accommodating portion. The first accommodating portion is configured to accommodate the first adhesive element. The first accommodating portion does not communicate with a first through hole of the movable part. When viewed along the first axis, the first V-shaped groove is symmetrical to the second V-shaped groove. When viewed along the first axis, the first end portion is symmetrical to the second end portion. When viewed along the first axis, the first connecting portion is symmetrical to the second connecting portion.

According to some embodiments, the at least two holding elements include a first holding element, a second holding element and a third holding element. The first holding element, the second holding element and the third holding element are made of metal. When viewed along the first axis, the first holding element has a plate-shaped structure extending along a second axis. The second axis is perpendicular to the first axis. Both ends of the first holding element are embedded in the movable part. When viewed along the first axis, the second holding element and the third holding element have a plate-shaped structure. Extending directions of the second holding element and the third holding element are not parallel to the second axis and a third axis. The third axis is perpendicular to the second axis and the first axis. When viewed along the first axis, both ends of the second holding element are embedded in the movable part. When viewed along the first axis, both ends of the third holding element are embedded in the movable part. When viewed along the first axis, extending directions of the first holding element, the second holding element and the third holding element form a triangular shape.

According to some embodiments, the fixed assembly includes a base. The base has a bottom plate and a side body, and the side body is disposed on the bottom plate. A first inserting hole and a second inserting hole are formed on the side body. The optical element driving mechanism further includes a first guiding rod and a second guiding rod. The first guiding rod and the second guiding rod extend along the first axis. The first guiding rod and the second guiding rod pass through the movable part and are respectively inserted into the first inserting hole and the second inserting hole, so as to guide the movable part to move along the first axis relative to the base. A central notch is further formed on the side body, located between the first inserting hole and a second inserting hole.

According to some embodiments, the base further has a positioning block disposed on the bottom plate. A central through hole is formed on the positioning block, corresponding to the central notch. The piezoelectric assembly is configured to pass through the central through hole and the movable part and then to be disposed in the central notch. The piezoelectric assembly is configured to drive the movable part to move between the side body and the positioning block.

According to some embodiments, the fixed assembly further includes a bottom cover fixedly connected to the base. The base has a first engaging structure, and the bottom cover has a second engaging structure. The first engaging structure is configured to engage with the second engaging structure so as to limit the movement of the bottom cover relative to the base. The positioning block is located between the side body and the bottom cover. A third inserting hole and a fourth inserting hole is formed on the bottom cover, and the first guiding rod and the second guiding rod are respectively inserted into the third inserting hole and the fourth inserting hole. A first gap is formed between the first guiding rod and the third inserting hole. A second gap is formed between the second guiding rod and the fourth inserting hole. The optical element driving mechanism further includes a first bonding element and a second bonding element. The first bonding element and the second bonding element are respectively disposed in the first gap and the second gap and configured to respectively fix the first guiding rod and the second guiding rod.

According to some embodiments, a first protruding structure is formed on the bottom cover and extends along the first axis toward the positioning block. An accommodating notch is formed on the first protruding structure and is configured to accommodate the counterweight. The counterweight is not in contact with the first protruding structure. The optical element driving mechanism further includes a first adhesive element disposed in the accommodating notch and connected to the first protruding structure and the counterweight.

According to some embodiments, the fixed assembly further includes an outer frame configured to frame the base and the bottom cover. The bottom cover has an outer surface, and at least one second protruding structure is formed on the outer surface. The at least one second protruding structure is engaged between the outer surface and the outer frame. A central perforation is further formed on the bottom cover and penetrates the bottom cover along the first axis, so that an external positioning post is inserted into the central perforation to be in contact with the counterweight, and then the piezoelectric assembly is driven to insert itself into the central through hole and the central notch.

According to some embodiments, the fixed assembly further includes a second elastic element and a third elastic element, each of which has a ring structure. The second elastic element is fixedly disposed in the central notch and ensheathes one end of the driving element. The third elastic element is tightly disposed in the central through hole and ensheathes the other end of the driving element.

According to some embodiments, when viewed along a third axis, a portion of the second elastic element is exposed by the side body. The third axis is perpendicular to the first axis. The optical element driving mechanism further includes a bonding element disposed on the second elastic element and the side body, configured to affix the second elastic element to the central notch of the side body. When viewed along the third axis, the bonding element overlaps a portion of the second elastic element.

According to some embodiments, when viewed along a second axis, the length of the movable part along the first axis is not equal to the length of the driving member along the first axis. The second axis is perpendicular to the first axis and the third axis. When viewed along the second axis, the length of the movable part along the first axis is greater than the length of the driving member along the first axis.

According to some embodiments, a first chamfer structure is formed on the positioning block and is connected to the central through hole. The first chamfer structure is configured to guide the third elastic element to be installed in the central through hole. The first chamfer structure faces the first protruding structure of the bottom cover. The optical element driving mechanism further includes a second adhesive element disposed between the third elastic element and the first chamfer structure to affix the third elastic element to the positioning block.

According to some embodiments, when viewed along the second axis, a first outer surface of the positioning block, a second outer surface of the driving member and a third outer surface of the third elastic element are coplanar.

According to some embodiments, when viewed along a third axis, the movable part has a U-shaped structure. The third axis is perpendicular to the first axis. The movable part has a base structure, a first extending structure, a second extending structure, a third extending structure and a fourth extending structure. The first extending structure to the fourth extending structure are extended from the base structure along the third axis. The first guiding rod passes through a first through hole of the first extending structure and a third through hole of the third extending structure. The second guiding rod passes through a second through hole of the second extending structure and a fourth through hole of the fourth extending structure.

According to some embodiments, a size of the first through hole is equal to a size of a third through hole. A size of the second through hole is equal to a size of a fourth through hole. The size of the third through hole is different from the size of the fourth through hole. The size of the third through hole is smaller than the size of the fourth through hole.

According to some embodiments, the optical element driving mechanism further includes a sensing assembly configured to sense the position of the movable part relative to the fixed assembly. The sensing assembly includes a sensing element and a sensed element. The sensed element is disposed on the bottom of the first extending structure, facing the circuit assembly. The sensing element is disposed on the circuit assembly and is configured to sense changes in the magnetic field of the sensed element. A length of the first extending structure along the third axis is different from a length of the third extending structure along the third axis. The length of the first extending structure along the third axis is greater than the length of the third extending structure along the third axis. The optical element driving mechanism further includes a first magnetic element and a second magnetic element. The first magnetic element is disposed on a bottom of the fourth extending structure. The second magnetic element is disposed on the base, corresponding to the first magnetic element. The first magnetic element and the second magnetic element generate a magnetic attraction force to stabilize movement of the movable part along the first axis. A length of the fourth extending structure along the third axis is different from a length of the second extending structure along the third axis. The length of the fourth extending structure along the third axis is greater than the length of the second extending structure along the third axis.

The present disclosure provides an optical element driving mechanism including a fixed assembly, a movable assembly and a driving assembly. The movable assembly is connected to an optical element, and the driving assembly drives the movable assembly to move with the optical element relative to the fixed assembly along a first axis. The driving assembly can be a piezoelectric assembly including a piezoelectric ceramic. Therefore, in contrast to the conventional driving mechanism composed of coils and magnets, the thrust of the optical element driving mechanism of the present disclosure can be increased more than threefold, so it can drive larger and heavier lenses.

In the present disclosure, the movable part of the movable assembly has a U-shaped structure, and the first guiding rod and the second guiding rod pass through the movable part to be fixed on the base and the bottom cover, so that the movable part can move back and forth along these two guiding rods. Based on such a structural design, it can be ensured that the movable part does not have the problem of rotating during the movement.

In addition, in some embodiments, the bottom of one of the extending structures of the movable part may be provided with a first magnetic element, and the bottom plate may be provided with a second magnetic element correspondingly. Based on such a structural design, the magnetic attraction generated between the two magnetic elements (the magnets) can make the movable part firmly lean against the second guiding rod, thereby stabilizing the movement of the movable part along the first axis.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
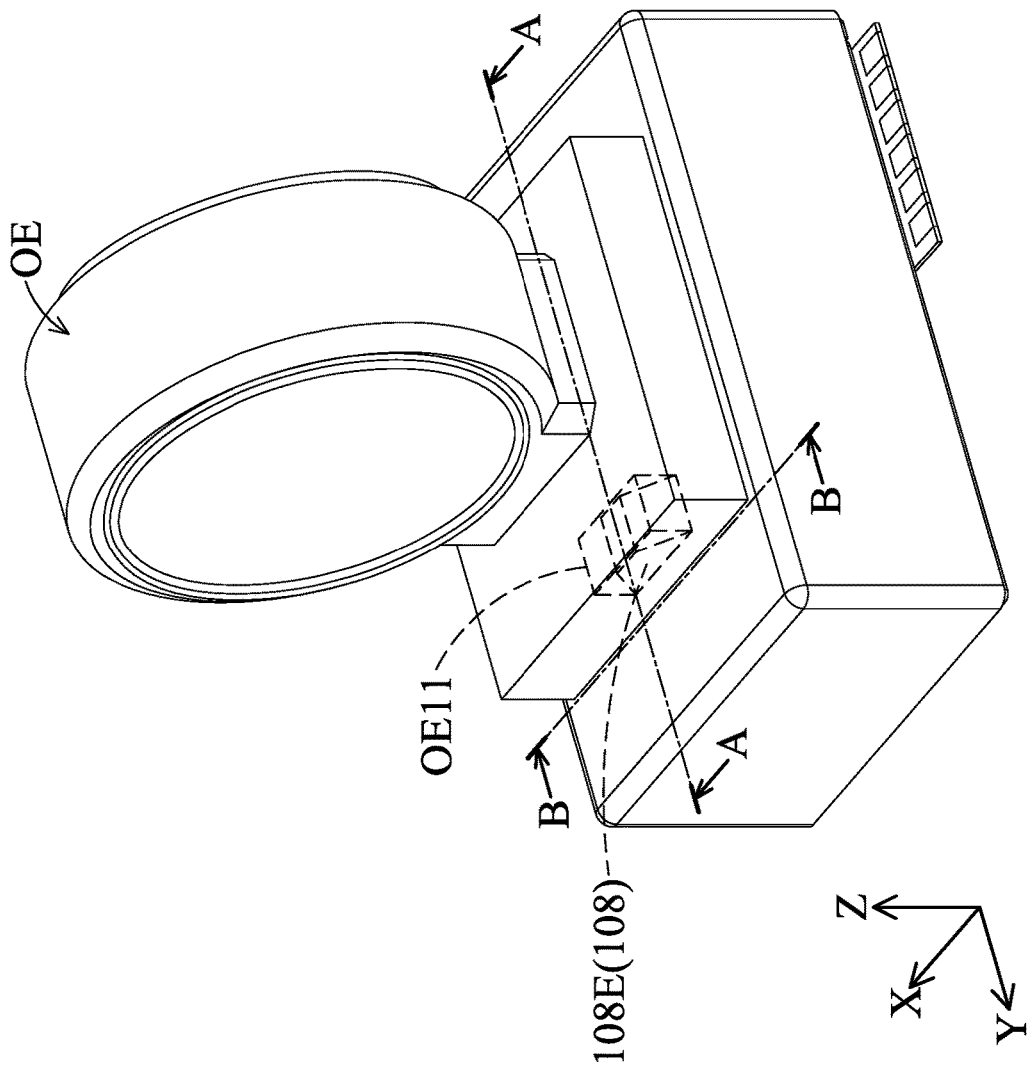
FIG. 1 shows a schematic diagram of an optical element driving mechanism 100 according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
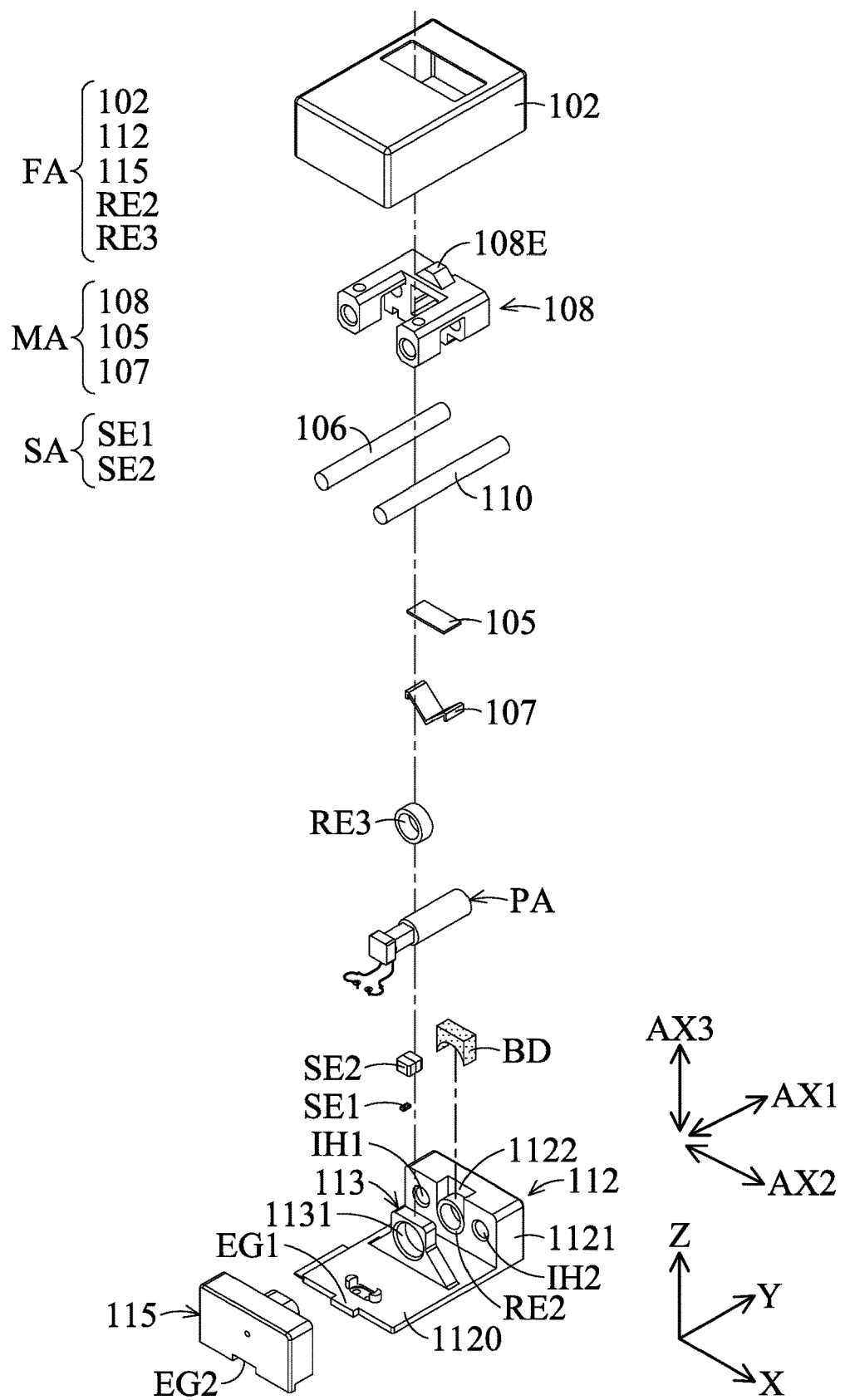
FIG. 2 shows an exploded diagram of the optical element driving mechanism 100 according to the embodiment of the present disclosure.
Figure 3:
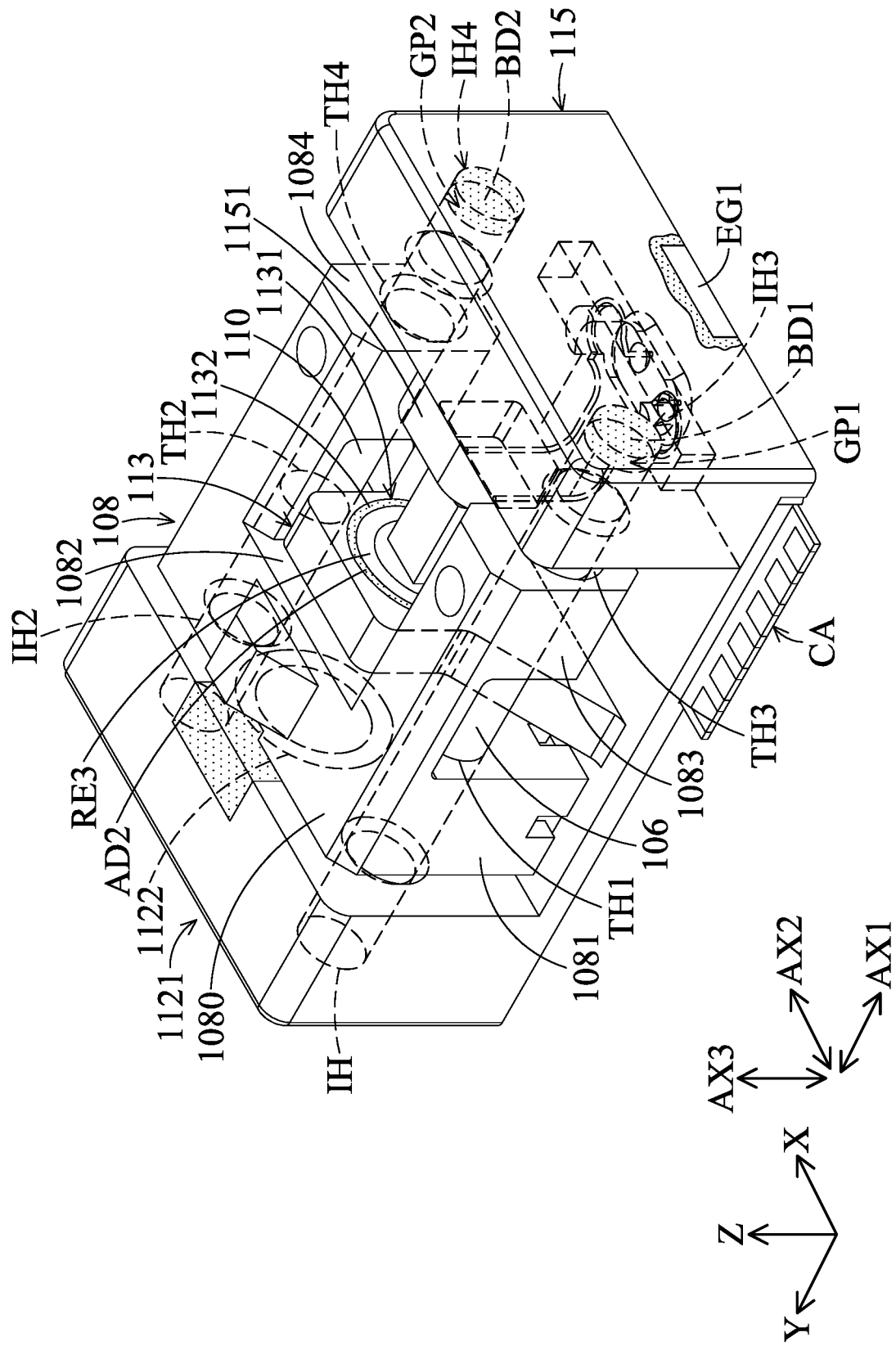
FIG. 3 is partial structure of a schematic diagram of the optical element driving mechanism 100 according to an embodiment of the present disclosure.

Please refer to FIG. 1 to FIG. 3. FIG. 1 shows a schematic diagram of an optical element driving mechanism 100 according to an embodiment of the present disclosure, FIG. 2 shows an exploded diagram of the optical element driving mechanism 100 according to the embodiment of the present disclosure, and FIG. 3 is partial structure of a schematic diagram of the optical element driving mechanism 100 according to an embodiment of the present disclosure. The optical element driving mechanism 100 can be an optical camera system and can be configured to hold and drive an optical element. The optical element driving mechanism 100 can be installed in different electronic devices or portable electronic devices, such as a smartphone, for allowing a user to perform the image capturing function.

In this embodiment, the optical element driving mechanism 100 may include a fixed assembly FA, a movable assembly MA, and a driving assembly DA. The movable assembly MA is configured to be connected to an optical element OE, and the movable assembly MA is movably connected to the fixed assembly FA. The driving assembly DA is configured to drive the movable assembly MA to move relative to the fixed assembly FA along a first axis AX1.

The movable assembly MA may include a movable part 108, and as shown in FIG. 1, the movable part 108 has a first buckle structure 108E configured to engage with a second buckle structure OE11 of the optical element OE. The first buckle structure 108E can be an engaging protrusion, and the second buckle structure OE11 can be an engaging recess, but they are not limited thereto.

In this embodiment, as shown in FIG. 2, the fixed assembly FA may include a base 112, the base 112 has a bottom plate 1120 and a side body 1121, and the side body 1121 is disposed on the bottom plate 1120. The bottom plate 1120 and the side body 1121 can be integrally formed as one piece, but they are not limited thereto. In this embodiment, a first inserting hole IH1 and a second inserting hole IH2 can be formed on the side body 1121.

Moreover, the optical element driving mechanism 100 may further include a first guiding rod 106 and a second guiding rod 110, and the first guiding rod 106 and the second guiding rod 110 extend along the first axis AX1. As shown in FIG. 3, the first guiding rod 106 and the second guiding rod 110 pass through the movable part 108 and are respectively inserted into the first inserting hole IH1 and the second inserting hole IH2, so as to guide the movable part 108 to move relative to the base 112 along the first axis AX1.

In this embodiment, the driving assembly may be a piezoelectric assembly PA configured to drive the movable part 108 to move. The driving assembly is not limited to the piezoelectric assembly PA of this embodiment. Correspondingly, a central notch 1122 can be further formed on the side body 1121 and is located between the first inserting hole IH1 and a second inserting hole IH2.

Moreover, the base 112 further has a positioning block 113, which is disposed on the bottom plate 1120. A central through hole 1131 is formed on the positioning block 113 corresponding to the central notch 1122. The piezoelectric assembly PA is configured to pass through the central through hole 1131 and the movable part 108 and then to be disposed in the central notch 1122.

As shown in FIG. 2 and FIG. 3, the fixed assembly FA further includes a bottom cover 115 fixedly connected to the base 112. Specifically, the base 112 has a first engaging structure EG1, and the bottom cover 115 has a second engaging structure EG2. The first engaging structure EG1 is configured to engage with the second engaging structure EG2 so as to limit the movement or rotation of the bottom cover 115 relative to the base 112.

When the first engaging structure EG1 is configured to be engaged with the second engaging structure EG2, glue can be used to fill between the first engaging structure EG1 and the second engaging structure EG2, so that the bottom cover 115 is fixedly connected to the base 112.

Figure 4:
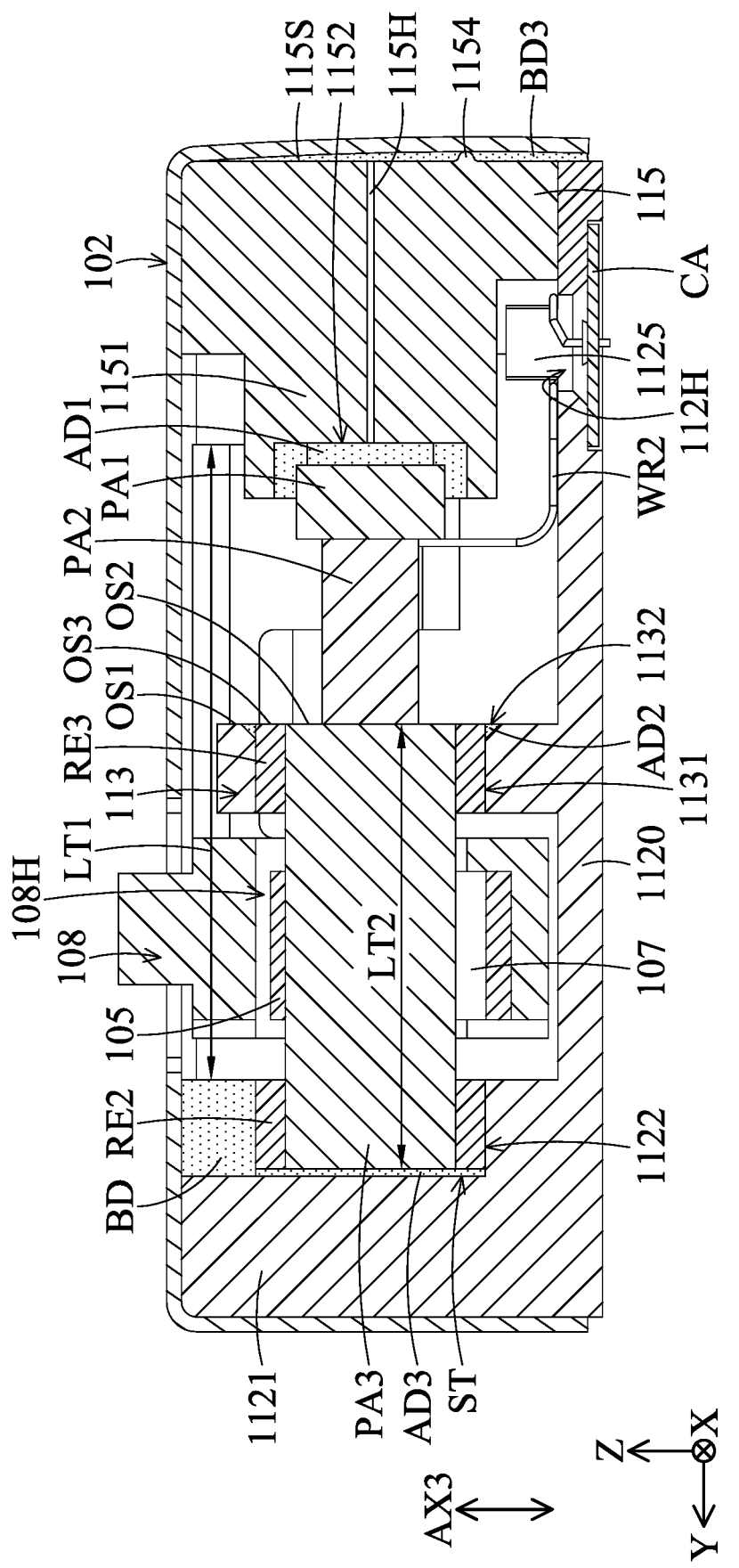
FIG. 4 is a cross-sectional view of the optical element driving mechanism 100 along line A-A in FIG. 1 according to an embodiment of the present disclosure.

Please refer to FIG. 1 to FIG. 4. FIG. 4 is a cross-sectional view of the optical element driving mechanism 100 along line A-A in FIG. 1 according to an embodiment of the present disclosure. As shown in FIG. 3 and FIG. 4, the positioning block 113 is located between the side body 1121 and the bottom cover 115. Furthermore, a third inserting hole IH3 and a fourth inserting hole IH4 are formed on the bottom cover 115, and the first guiding rod 106 and the second guiding rod 110 are respectively inserted into the third inserting hole IH3 and the fourth inserting hole IH4.

It should be noted that a first gap GP1 is formed between the first guiding rod 106 and the third inserting hole IH3, and a second gap GP2 is formed between the second guiding rod 110 and the fourth inserting hole IH4. In this embodiment, the optical element driving mechanism 100 may further include a first bonding element BD1 and a second bonding element BD2. The first bonding element BD1 and the second bonding element BD2 can be glue, but they are not limited thereto.

The first bonding element BD1 and the second bonding element BD2 are respectively disposed in the first gap GP1 and the second gap GP2 and configured to fix the first guiding rod 106 and the second guiding rod 110 respectively.

Moreover, a first protruding structure 1151 is further formed on the bottom cover 115 and extends along the first axis AX1 toward the positioning block 113. An accommodating notch 1152 is formed on the first protruding structure 1151 and is configured to accommodate a portion of a counterweight PA1 of the piezoelectric assembly PA.

It is worth noting that the counterweight PA1 is not in contact with the first protruding structure 1151, and the optical element driving mechanism 100 may further include a first adhesive element AD1, which is disposed in the accommodating notch 1152, so as to connect the first protruding structure 1151 and the counterweight PA1.

The fixed assembly FA further includes an outer frame 102 configured to frame the base 112 and bottom cover 115. The bottom cover 115 has an outer surface 115S, and at least one second protruding structure 1154 is formed on the outer surface 115S. When the outer frame 102 frames the base 112 and the bottom cover 115, the at least one second protruding structure 1154 is engaged between the outer surface 115S and the outer frame 102, thereby increasing the connection strength of the fixed assembly FA.

In this embodiment, the second protruding structure 1154 is a bump, but it is not limited thereto. In other embodiments, the second protruding structure 1154 can be a plurality of elongated texture structures. Moreover, as shown in FIG. 4, the optical element driving mechanism 100 further includes a third bonding element BD3, which is disposed in the gap between the outer surface 115S and the outer frame 102, so as to increase the connection strength between the outer frame 102 and the bottom cover 115.

In this embodiment, the piezoelectric assembly PA may further include a piezoelectric element PA2 and a driving member PA3, and the piezoelectric element PA2 is fixedly connected between the counterweight PA1 and the driving member PA3. The piezoelectric element PA2 is, for example, a piezoelectric ceramic, but it is not limited thereto. The driving member PA3 can have a long strip-shaped structure (a rod structure) extending along the first axis AX1. The driving member PA3 can be made of carbon material, but it is not limited thereto.

Figure 5:
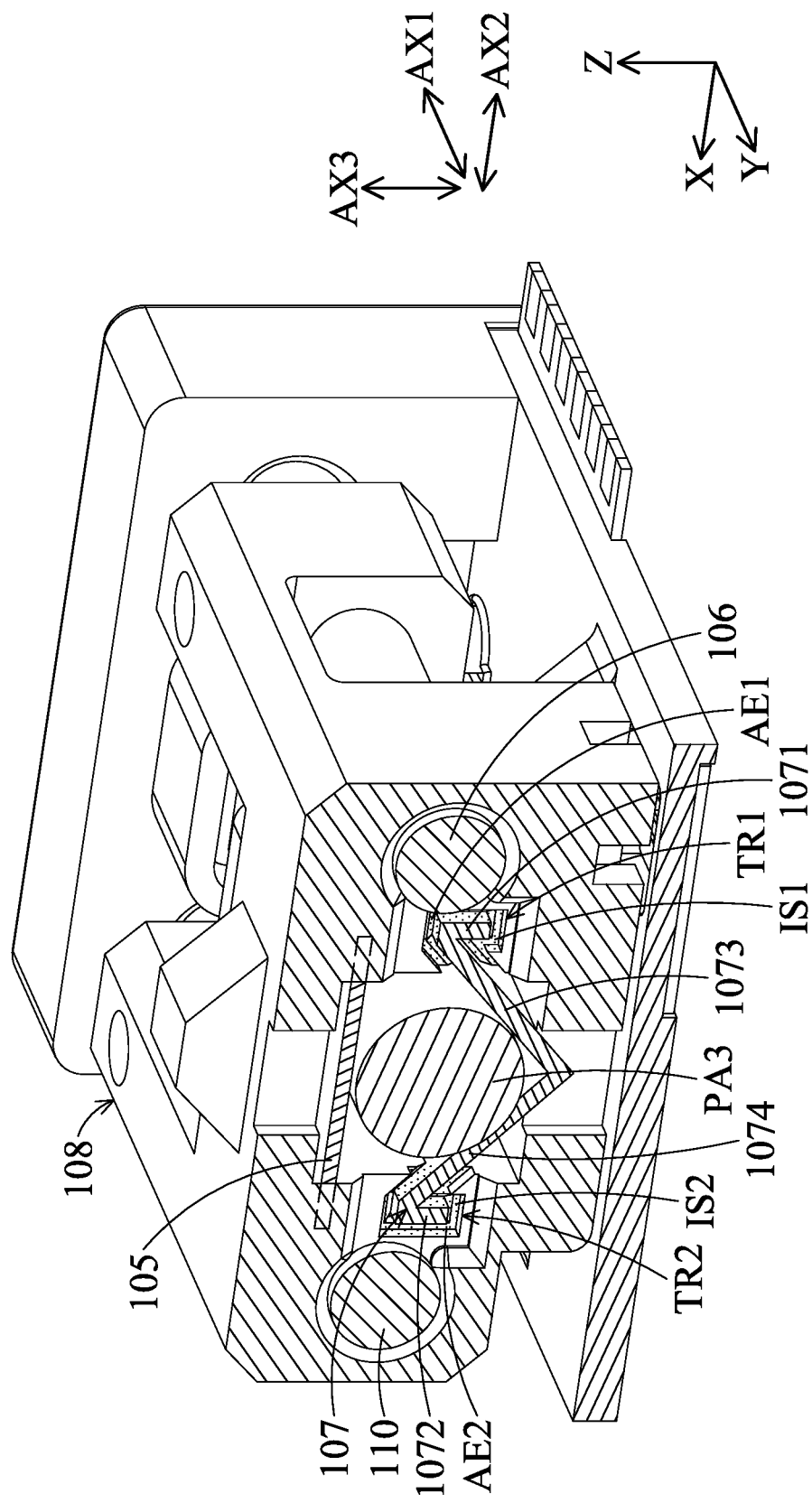
FIG. 5 is a cross-sectional view of the optical element driving mechanism 100 along line B-B in FIG. 1 according to an embodiment of the present disclosure.

Next, please refer to FIG. 4 and FIG. 5. FIG. 5 is a cross-sectional view of the optical element driving mechanism 100 along line B-B in FIG. 1 according to an embodiment of the present disclosure. The movable assembly MA further includes at least two holding elements, the at least two holding elements 104 and the driving member PA3 are disposed in a central opening 108H of the movable part 108, and the at least two holding elements are configured to hold the driving member PA3.

Specifically, in this embodiment, the movable assembly MA includes a first holding element 105 and a second holding element 107, and the first holding element 105 and the second holding element 107 are made of metal. For example, the second holding element 107 is a bendable metal sheet.

As shown in FIG. 5, when viewed along the first axis AX1, the first holding element 105 has a plate-shaped structure extending along a second axis AX2, and the second axis AX2 is perpendicular to the first axis AX1. In this embodiment, both ends of the first holding element 105 are embedded in the movable part 108 by insert molding technology.

When viewed along the first axis AX1, the second holding element 107 has a V-shaped structure. Specifically, the second holding element 107 has a first end portion 1071, a first connecting portion 1073, a second connecting portion 1074 and a second end portion 1072. The first connecting portion 1073 is connected between the first end portion 1071 and the second connecting portion 1074, and the second connecting portion 1074 is connected between the first connecting portion 1073 and the second end portion 1072.

The first end portion 1071 and the second end portion 1072 extend along a third axis AX3, and the third axis AX3 is perpendicular to the second axis AX2 and the first axis AX1.

As shown in FIG. 5, the extending directions of the first connecting portion 1073 and the second connecting portion 1074 are not parallel to the second axis AX2 and the third axis AX3. In this embodiment, the first holding element 105, the first connecting portion 1073 and the second connecting portion 1074 are in contact with the driving member PA3 so as to hold the driving member PA3 together.

Furthermore, the movable part 108 can form a first V-shaped groove TR1 and a second V-shaped groove TR2, which are connected to the central opening 108H and configured to respectively accommodate the first end portion 1071 and the second end portion 1072.

In this embodiment, a plurality of slope structures IS1 and IS2 are respectively formed in the first V-shaped groove TR1 and the second V-shaped groove TR2, and are configured to guide the corresponding first connecting portion 1073 and second connecting portion 1074.

Correspondingly, the optical element driving mechanism further includes a first adhesive element AE1 and a second adhesive element AE2, respectively disposed in the first V-shaped groove TR1 and the second V-shaped groove TR2, configured to fix the first end portion 1071 and the second end portion 1072.

Figure 6:
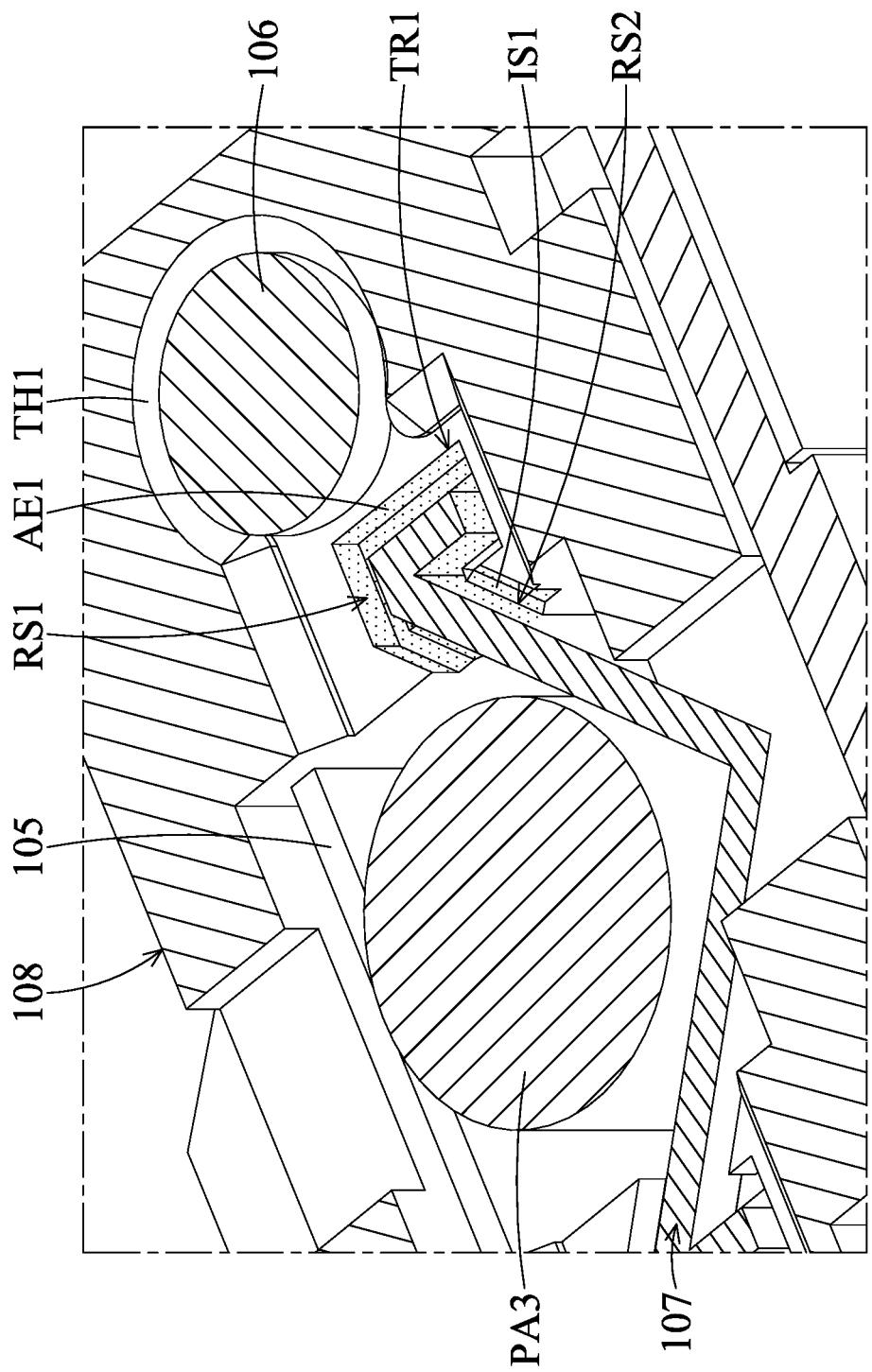
FIG. 6 is an enlarged view of FIG. 5 in another viewing according to an embodiment of the present disclosure.

Please refer to FIG. 5 and FIG. 6. FIG. 6 is an enlarged view of FIG. 5 in another viewing according to an embodiment of the present disclosure. As shown in FIG. 6, the first V-shaped groove TR1 has a first accommodating portion RS1 and a second accommodating portion RS2, and these slope structures IS1 are formed between the first accommodating portion RS1 and the second accommodating portion RS2.

It should be noted that, as shown in FIG. 6, when the second holding element 107 is disposed in the first V-shaped groove TR1, the second holding element 107 does not protrude from the first accommodating portion RS1. The first accommodating portion RS1 is configured to accommodate the first adhesive element AE1, and the first accommodating portion RS1 does not communicate with a first through hole TH1 of the movable part 108. The first adhesive element AE1 is, for example, glue, and based on the above structural design, the first adhesive element AE1 is not in contact with the first guiding rod 106 to affect the movement of the movable part 108.

Moreover, as shown in FIG. 5, when viewed along the first axis AX1, the first V-shaped groove TR1 is symmetrical to the second V-shaped groove TR2. When viewed along the first axis AX1, the first end portion 1071 is symmetrical to the second end portion 1072. When viewed along the first axis AX1, the first connecting portion 1073 is symmetrical to the second connecting portion 1074.

Please return to FIG. 4. The fixed assembly FA further includes a second elastic element RE2 and a third elastic element RE3, each of them have a ring structure. The second elastic element RE2 is fixedly disposed in the central notch 1122 and ensheathes one end of the driving member PA3. The third elastic element RE3 is tightly disposed in the central through hole 1131 and ensheathes the other end of the driving member PA3.

When viewed along the third axis AX3, a portion of the second elastic element RE2 is exposed by the side body 1121 (FIG. 2). Furthermore, the optical element driving mechanism 100 may further include a bonding element BD disposed on the second elastic element RE2 and the side body 1121 and configured to affix the second elastic element RE2 to the central notch 1122 of the side body 1121. When viewed along the third axis AX3, the bonding element BD is disposed in the central notch 1122 and overlaps a portion of the second elastic element RE2.

Specifically, in this embodiment, the operator can directly put the second elastic element RE2 into the central notch 1122 along the third axis AX3, and then use the bonding element BD to affix the second elastic element RE2 to the side body 1121, and finally insert the driving member PA3 into the second elastic element RE2. Based on such a design, the convenience of assembly by the operator can be increased. In addition, such a design can also be applied to the positioning block 113 to facilitate the operator to install the third elastic element RE3.

As shown in FIG. 4, when viewed along the second axis AX2, the first holding element 105 and the second holding element 107 are disposed between the second elastic element RE2 and the third elastic element RE3. Moreover, in this embodiment, the hardness of the second elastic element RE2 is equal to the hardness of the third elastic element RE3, but it is not limited thereto.

Based on the above configuration, when the piezoelectric element PA2 vibrates, it can drive the driving member PA3 to vibrate to generate a friction force between the driving member PA3 and the two holding elements, thereby driving the movable part 108 to move along the first axis AX1.

It is worth noting that, as shown in FIG. 4, a central perforation 115H is further formed on the bottom cover 115 and penetrates the bottom cover 115 along the first axis AX1, so that an external positioning post (not shown in the figures) is inserted into the central perforation 115H to be in contact with the counterweight PA1, and then the piezoelectric assembly PA is driven to insert itself into the central through hole 1131 and the central notch 1122.

Figure 7:
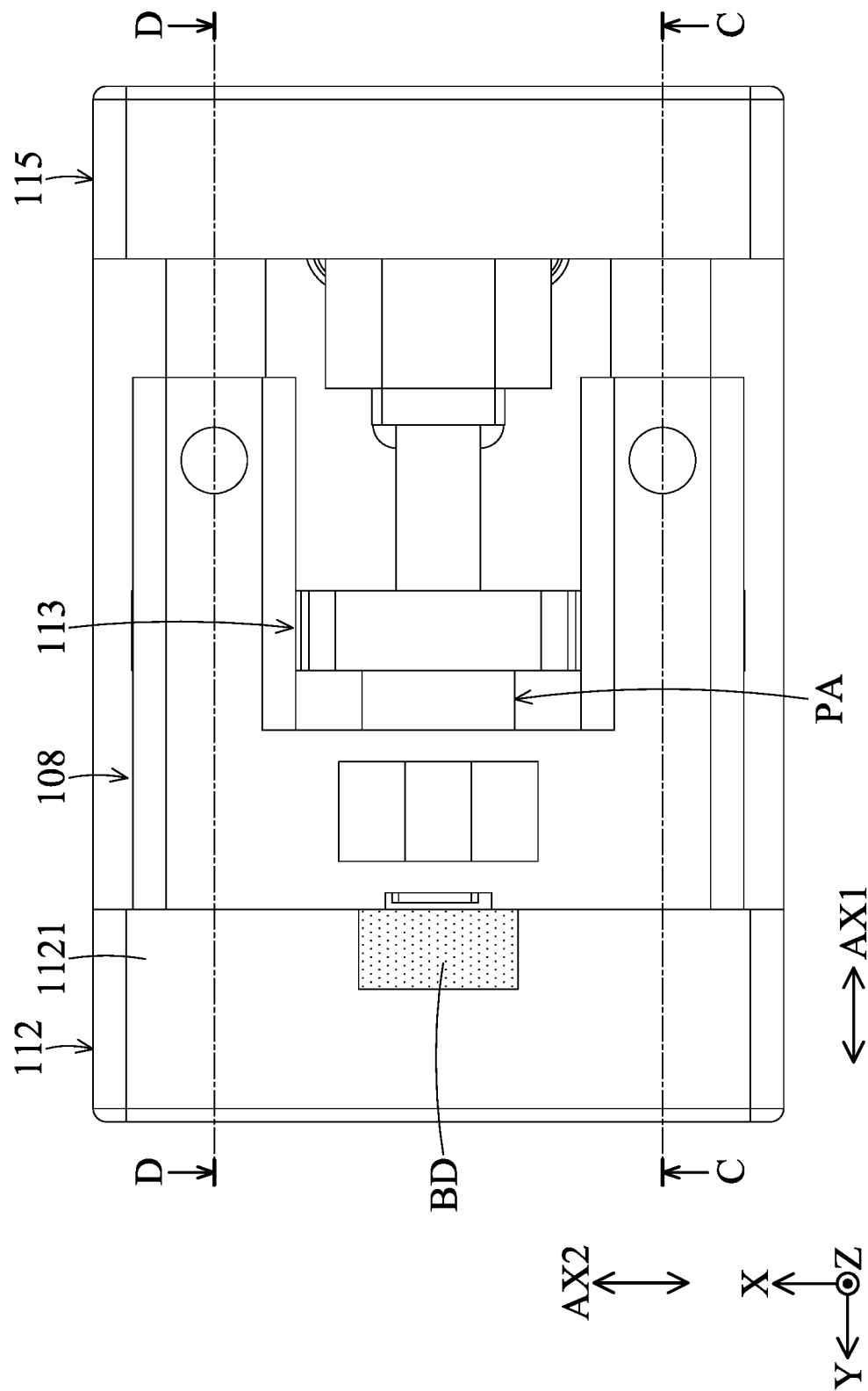
FIG. 7 and FIG. 8 are top views of the movable part 108 in different positions relative to the base 112 of the fixed assembly FA according to an embodiment of the present disclosure.
Figure 8:
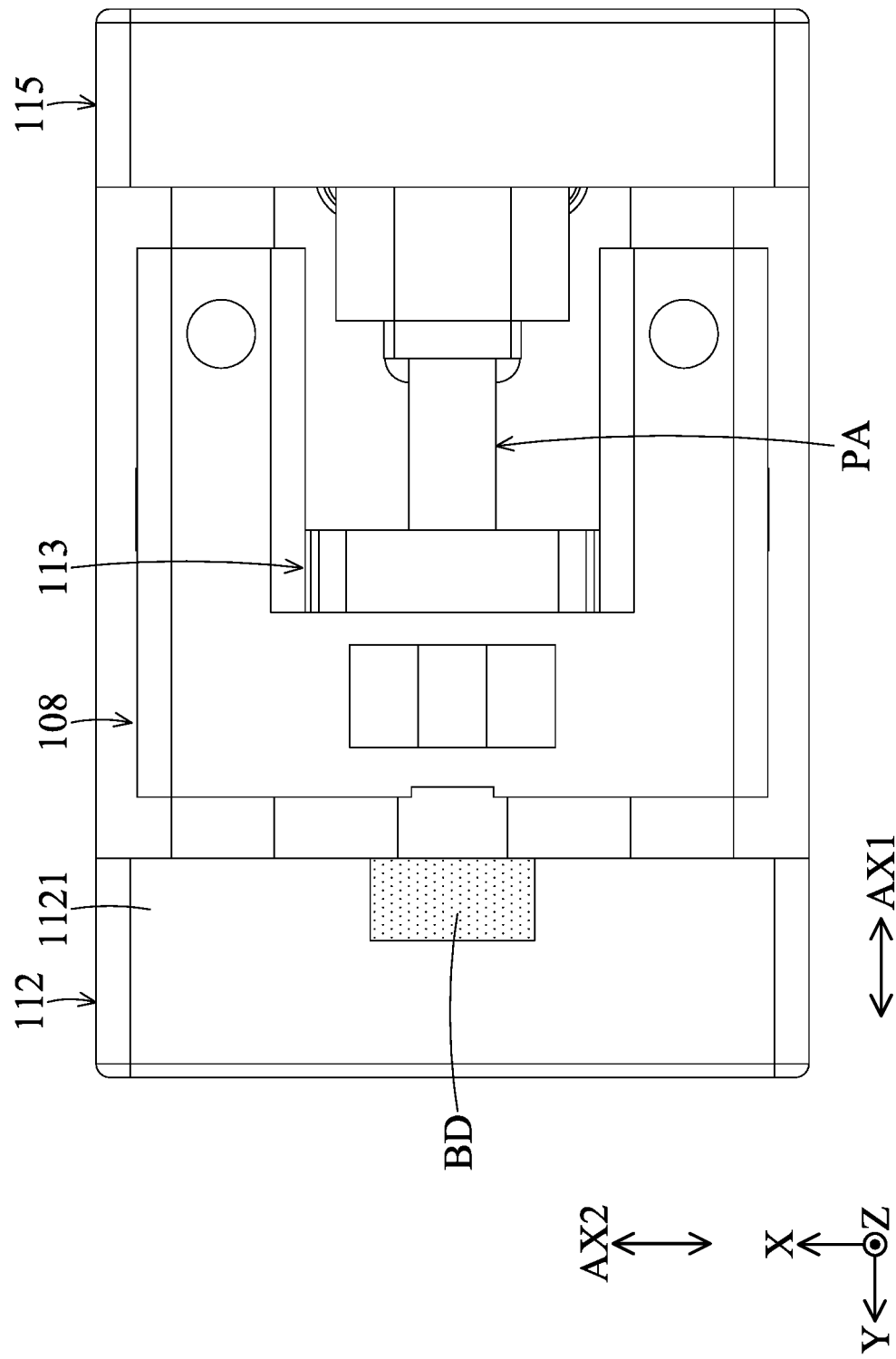

Please refer to FIG. 7 and FIG. 8. FIG. 7 and FIG. 8 are top views of the movable part 108 in different positions relative to the base 112 of the fixed assembly FA according to an embodiment of the present disclosure. As shown in FIG. 7 and FIG. 8, the piezoelectric assembly PA can drive the movable part 108 to move between the side body 1121 and the positioning block 113 back and forth along the first axis AX1 so as to drive the optical element OE to perform a function such as auto focusing.

When the movable part 108 is located in a first extreme position in FIG. 7, the movable part 108 is configured to be in contact with the side body 1121 of the base 112. Correspondingly, when the movable part 108 is located in a second extreme position in FIG. 8, the movable part 108 is configured to be in contact with the positioning block 113. That is, the side body 1121 and the positioning block 113 can serve as a stop assembly to limit the motion of range of the movable part 108.

Please return to FIG. 4. When viewed along the second axis AX2, the length LT1 of the movable part 108 along the first axis AX1 is not equal to the length LT2 of the driving member PA3 along the first axis AX1. Specifically, when viewed along the second axis AX2, the length LT1 of the movable part 108 along the first axis AX1 is greater than the length LT2 of the driving member PA3 along the first axis AX1.

Moreover, as shown in FIG. 3 and FIG. 4, a first chamfer structure 1132 is further formed on the positioning block 113 connected to the central through hole 1131. The first chamfer structure 1132 is configured to guide the installation of the third elastic element RE3 in the central through hole 1131. The first chamfer structure 1132 faces the first protruding structure 1151 of the bottom cover 115.

In addition, the optical element driving mechanism 100 may further include a second adhesive element AD2 disposed between the third elastic element RE3 and the first chamfer structure 1132 to affix the third elastic element RE3 to the positioning block 113.

It is worth noting that when viewed along the second axis AX2, a first outer surface OS1 of the positioning block 113, a second outer surface OS2 of the driving member PA3 and a third outer surface of the third elastic element RE3 OS3 are coplanar.

For example, the operator can use a tool to install the piezoelectric assembly PA and perform the positioning procedure so that the first outer surface OS1, the second outer surface OS2, and the third outer surface OS3 are coplanar, so as to make sure that the piezoelectric assembly PA is properly positioned.

In addition, as shown in FIG. 4, a slit ST may be formed between the driving member PA3, the second elastic element RE2 and the base 112, and the optical element driving mechanism 100 further includes a third adhesive element AD3, which is disposed in the slit ST, to affix the second elastic element RE2 to the base 112. In this embodiment, the third adhesive member AD3 and the bonding element BD can be integrally formed as one piece.

As shown in FIG. 3 and FIG. 7, when viewed along a third axis AX3, the movable part 108 has a U-shaped structure. In this embodiment, the movable part 108 has a base structure 1080, a first extending structure 1081, a second extending structure 1082, a third extending structure 1083 and a fourth extending structure 1084.

The first extending structure 1081 to the fourth extending structure 1084 are extended from the base structure 1080 along the third axis AX3. The first guiding rod 106 passes through a first through hole TH1 of the first extending structure 1081 and a third through hole TH3 of the third extending structure 1083. Similarly, the second guiding rod 110 passes through a second through hole TH2 of the second extending structure 1082 and a fourth through hole TH4 of the fourth extending structure 1084.

In this embodiment, the size of the first through hole TH1 is equal to the size of the third through hole TH3, the size of the second through hole TH2 is equal to the size of the fourth through hole TH4, and the size of the third through hole TH3 is different from the size of the fourth through hole TH4. For example, the size of the third through hole TH3 is smaller than the size of the fourth through hole TH4.

For example, when viewed along the first axis AX1, the first through hole TH1 and the third through hole TH3 may be circular, and the second through hole TH2 and the fourth through hole TH4 may be elliptical. Based on such a design, it can ensure the convenience and accuracy of installing the first guiding rod 106 and the second guiding rod 110 by the operator. In addition, in some embodiments, the first through hole TH1 to the fourth through hole TH4 may also have chamfer structures similar to the first chamfer structure 1132, so as to facilitate the operator's installation procedure.

Figure 9:
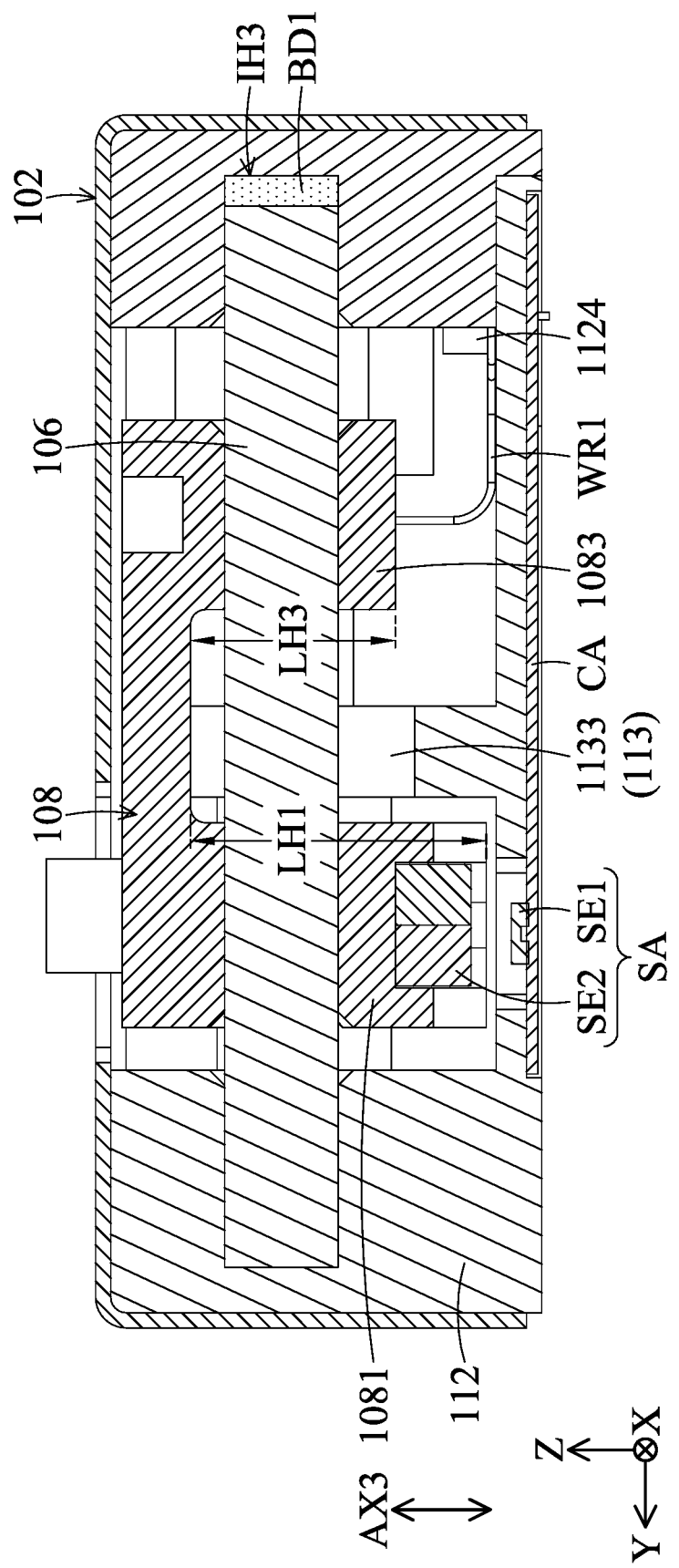
FIG. 9 is a cross-sectional view of the optical element driving mechanism 100 along line C-C in FIG. 7 according to an embodiment of the present disclosure.

Next, please refer to FIG. 3, FIG. 4 and FIG. 9. FIG. 9 is a cross-sectional view of the optical element driving mechanism 100 along line C-C in FIG. 7 according to an embodiment of the present disclosure. In this embodiment, the optical element driving mechanism 100 may further include a circuit assembly CA disposed in the base 112. In this embodiment, the circuit assembly CA can be a flexible circuit board which is fixedly disposed on the bottom surface of the bottom plate 1120. Based on such a design, process steps and manufacturing costs can be reduced.

Correspondingly, the piezoelectric element PA2 has a first leading wire WR1 and a second leading wire WR2, which are electrically connected to the circuit assembly CA. A guiding hole 112H is further formed on the base 112 and is configured to guide the first leading wire WR1 and the second leading wire WR2 to be connected to the circuit assembly CA.

As shown in FIG. 4, when viewed along the third axis AX3, the guiding hole 112H overlaps a portion of the circuit assembly CA. Furthermore, a first positioning post 1124 and a second positioning post 1125 are formed on the base 112.

The first leading wire WR1 and the second leading wire WR2 are respectively wound on the first positioning post 1124 and the second positioning post 1125 and then connected to the circuit assembly CA.

Based on the structural design described above, the convenience for the operator during assembly can be increased, and the problem that the leading wire is easy broken can also be avoided.

As shown in FIG. 9, the optical element driving mechanism 100 may further include a sensing assembly SA configured to sense the position of the movable part 108 relative to the fixed assembly FA. The sensing assembly SA includes a sensing element SE1 and a sensed element SE2. In this embodiment, the sensing element SE1 can be a Hall sensor, and the sensed element SE2 can be a Hall magnet, but they are not limited thereto.

The sensed element SE2 is disposed on the bottom of the first extending structure 1081 and faces the circuit assembly CA. The sensing element SE1 is disposed on the circuit assembly CA and is electrically connected to the circuit assembly CA, and the sensing element SE1 is configured to sense changes in the magnetic field of the sensed element SE2 so as to sense the position of the movable part 108 relative to the fixed assembly FA.

It should be noted that the length LH1 of the first extending structure 1081 along the third axis AX3 is different from the length LH3 of the third extending structure 1083 along the third axis AX3. Specifically, the length LH1 of the first extending structure 1081 along the third axis AX3 is greater than the length LH3 of the third extending structure 1083 along the third axis AX3. Based on such a structural configuration, the sensing accuracy of the sensing assembly SA can be increased.

Figure 10:
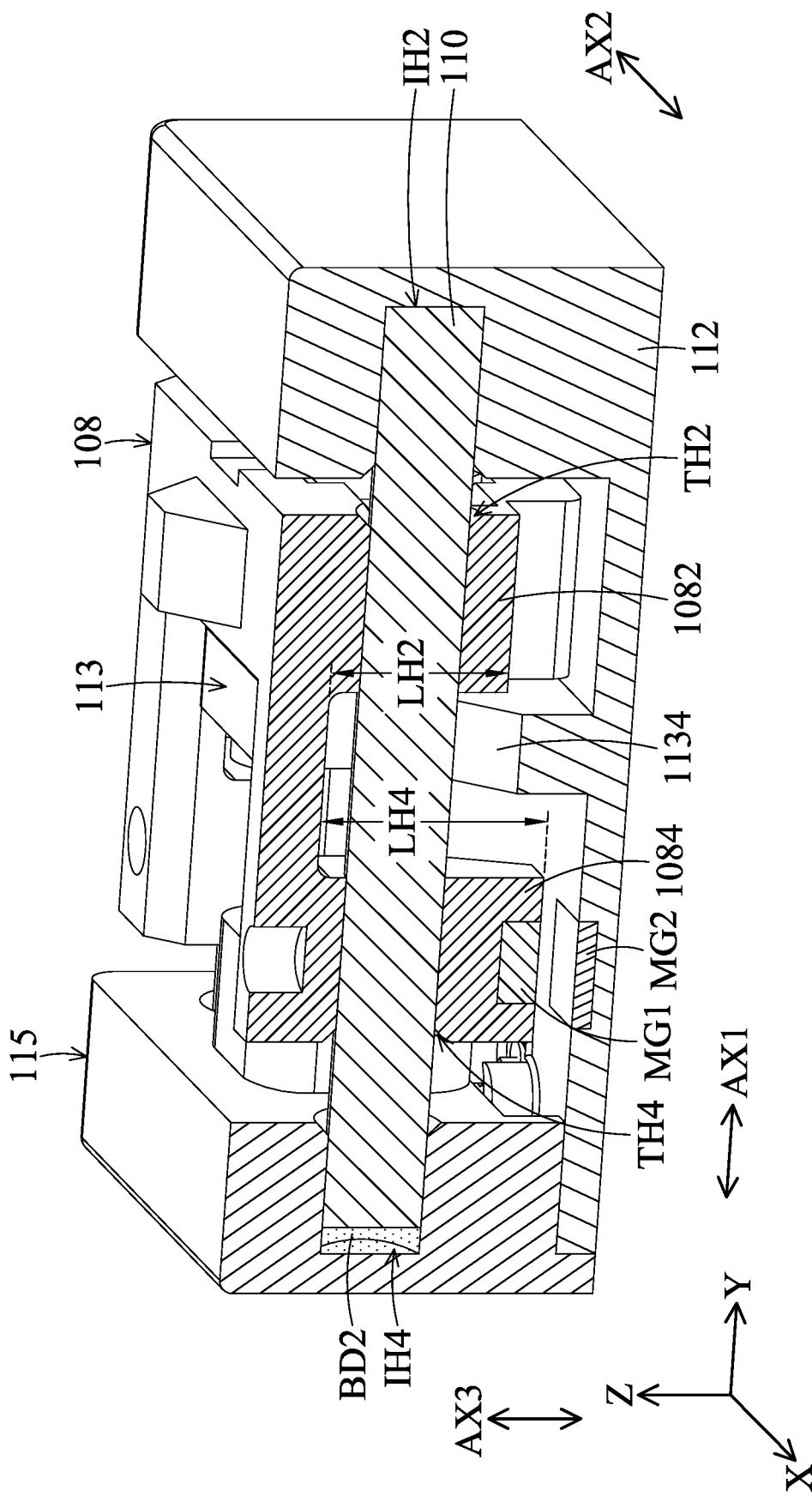
FIG. 10 is a cross-sectional view of the optical element driving mechanism 100 along line D-D in FIG. 7 according to an embodiment of the present disclosure.

Please refer to FIG. 10, which is a cross-sectional view of the optical element driving mechanism 100 along line D-D in FIG. 7 according to an embodiment of the present disclosure. The optical element driving mechanism 100 further includes a first magnetic element MG1 and a second magnetic element MG2, the first magnetic element MG1 is disposed on the bottom of the fourth extending structure 1084, and the second magnetic element MG2 corresponding to the first magnetic element MG1 is disposed on the base 112.

A magnetic attraction force is generated between the first magnetic element MG1 and the second magnetic element MG2, so that when the fourth through hole TH4 is larger than the diameter of the second guiding rod 110 due to tolerance, the movable part 108 can be exactly in contact with the second guiding rod 110 so as to stabilize the movement of the movable part 108 along the first axis AX1.

As shown in FIG. 10, the length LH4 of the fourth extending structure 1084 along the third axis AX3 is different from the length LH2 of the second extending structure 1082 along the third axis AX3. Specifically, the length LH4 of the fourth extending structure 1084 along the third axis AX3 is greater than the length LH2 of the second extending structure 1082 along the third axis AX3. Based on such a configuration, it can be ensured that the aforementioned magnetic attraction force can effectively stabilize the movement of the movable part 108 along the first axis AX1.

As shown in FIG. 9 and FIG. 10, when viewed along the third axis AX3, the first extending structure 1081 and the third extending structure 1083 are located on both sides of the positioning block 113. Similarly, when viewed along the third axis AX3, the second extending structure 1082 and the fourth extending structure 1084 are located on both sides of the positioning block 113.

Figure 11:
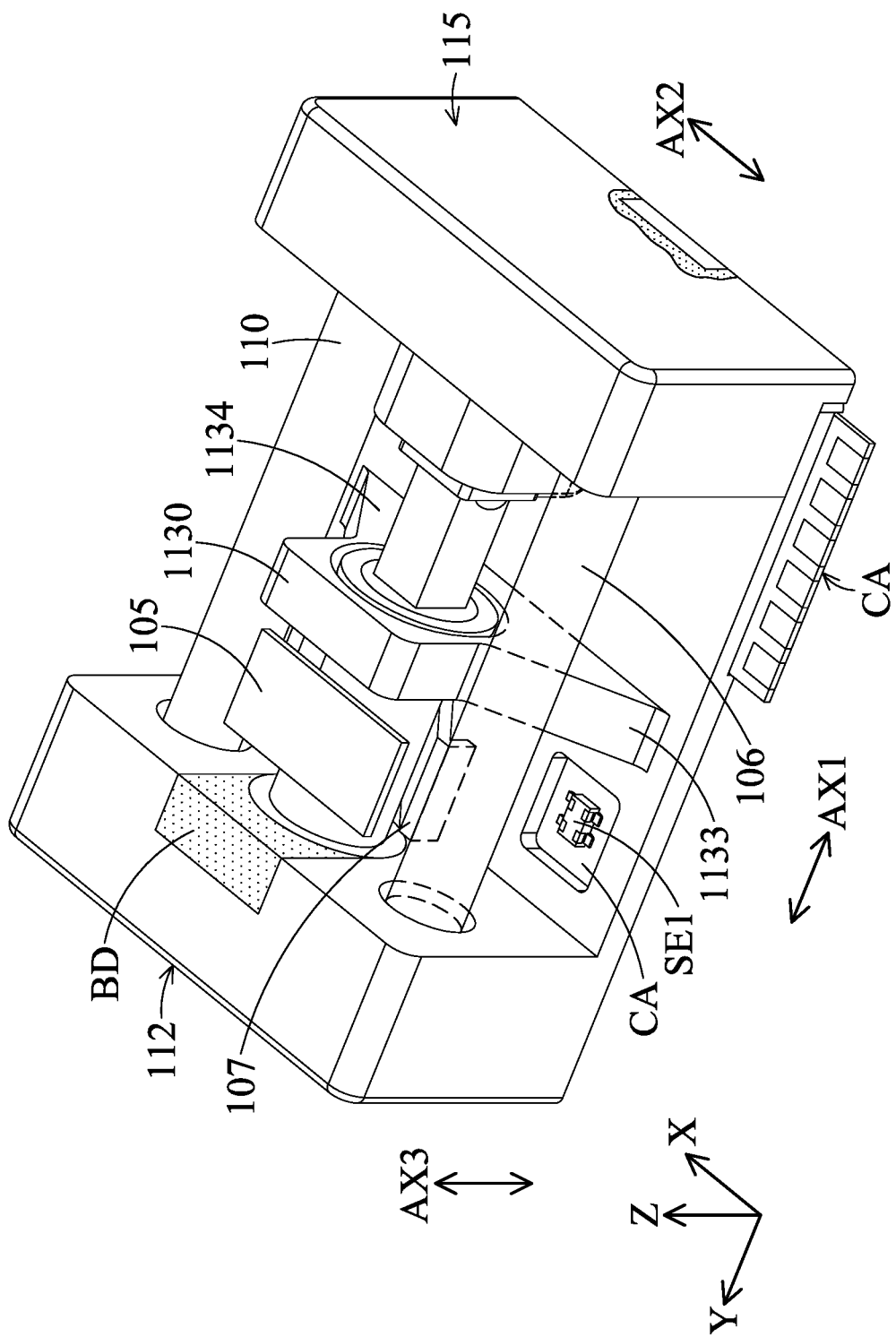
FIG. 11 is a perspective view of a partial structure of the optical element driving mechanism 100 according to an embodiment of the present disclosure.

Please refer to FIG. 11, which is a perspective view of a partial structure of the optical element driving mechanism 100 according to an embodiment of the present disclosure. In this embodiment, the positioning block 113 has a central protruding structure 1130, a first side bevel structure 1133 and a second side bevel structure 1134, and the central protruding structure 1130 is connected between the first side bevel structure 1133 and the second side bevel structure 1134. The central protruding structure 1130, the first side bevel structure 1133 and the second side bevel structure 1134 are integrally formed as one piece.

When viewed along the first axis AX1, the first guiding rod 106 does not overlap the first side bevel structure 1133. When viewed along the first axis AX1, the second guiding rod 110 does not overlap the second side bevel structure 1134.

As shown in FIG. 9 and FIG. 10, when viewed along the first axis AX1, the first extending structure 1081 overlaps a portion of the first side bevel structure 1133. When viewed along the first axis AX1, the second extending structure 1082 overlaps a portion of the second side bevel structure 1134.

Based on the structural design of the above positioning block 113, the connection strength between the positioning block 113 and the bottom plate 1120 can be ensured, so as to avoid the problem that the positioning block 113 is separated from the bottom plate 1120 when the optical element driving mechanism 100 is impacted.

Figure 12:
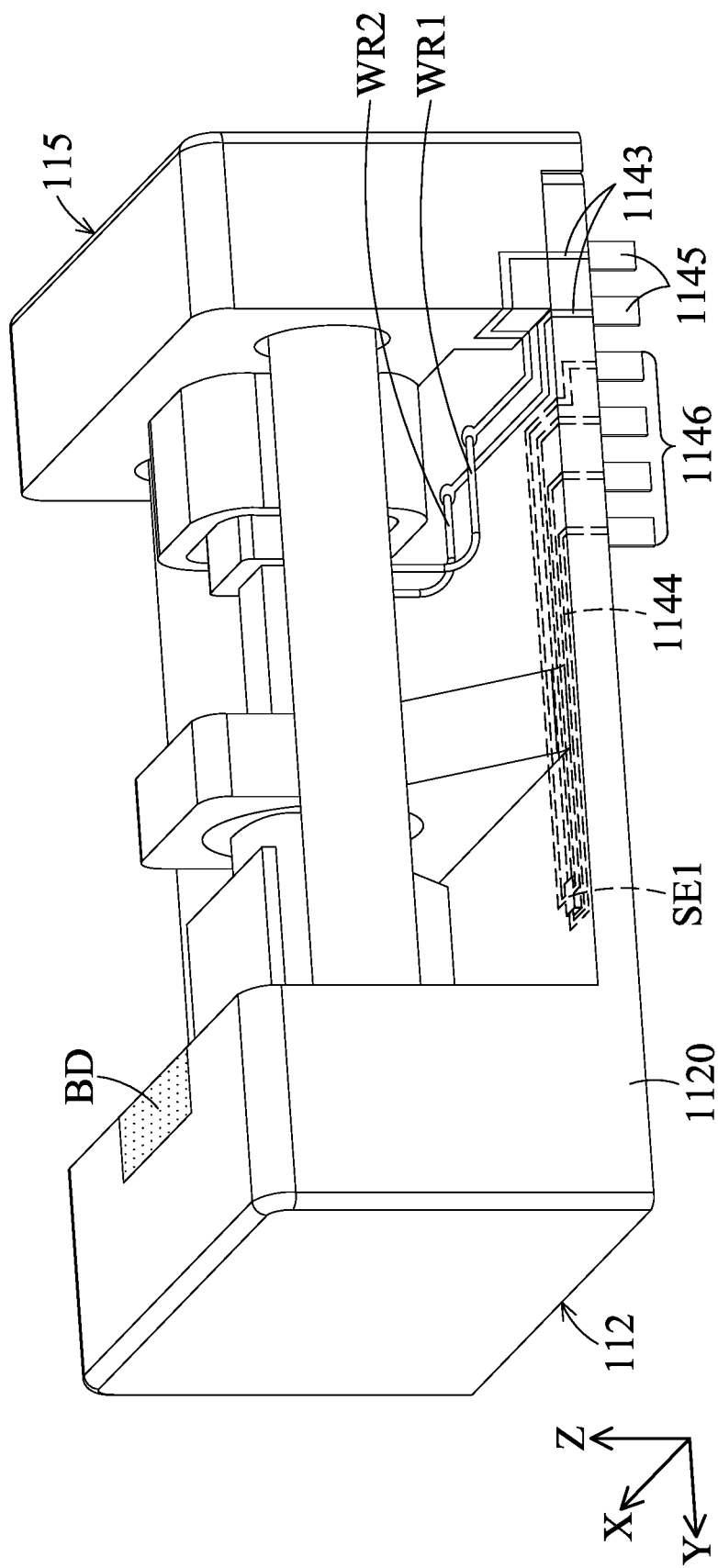
FIG. 12 is a perspective view of a partial structure of the optical element driving mechanism 100 according to another embodiment of the present disclosure.

Please refer to FIG. 12, which is a perspective view of a partial structure of the optical element driving mechanism 100 according to another embodiment of the present disclosure. In this embodiment, the circuit assembly CA may include two third circuit members 1143 and a plurality of fourth circuit members 1144. The first leading wire WR1 and the second leading wire WR2 can be electrically connected to the first pins 1145 through the two third circuit members 1143, and the sensing element SE1 can be electrically connected to the second pins 1146 through the fourth circuit members 1144.

In this embodiment, the third circuit members 1143 and the fourth circuit members 1144 are formed on the surfaces of the bottom plate 1120 and the bottom cover 115 by using laser direct structuring (LDS) technology. Based on such a design, the height of the optical element driving mechanism 100 along the Z-axis can be further reduced so as to achieve miniaturization.

Figure 13:
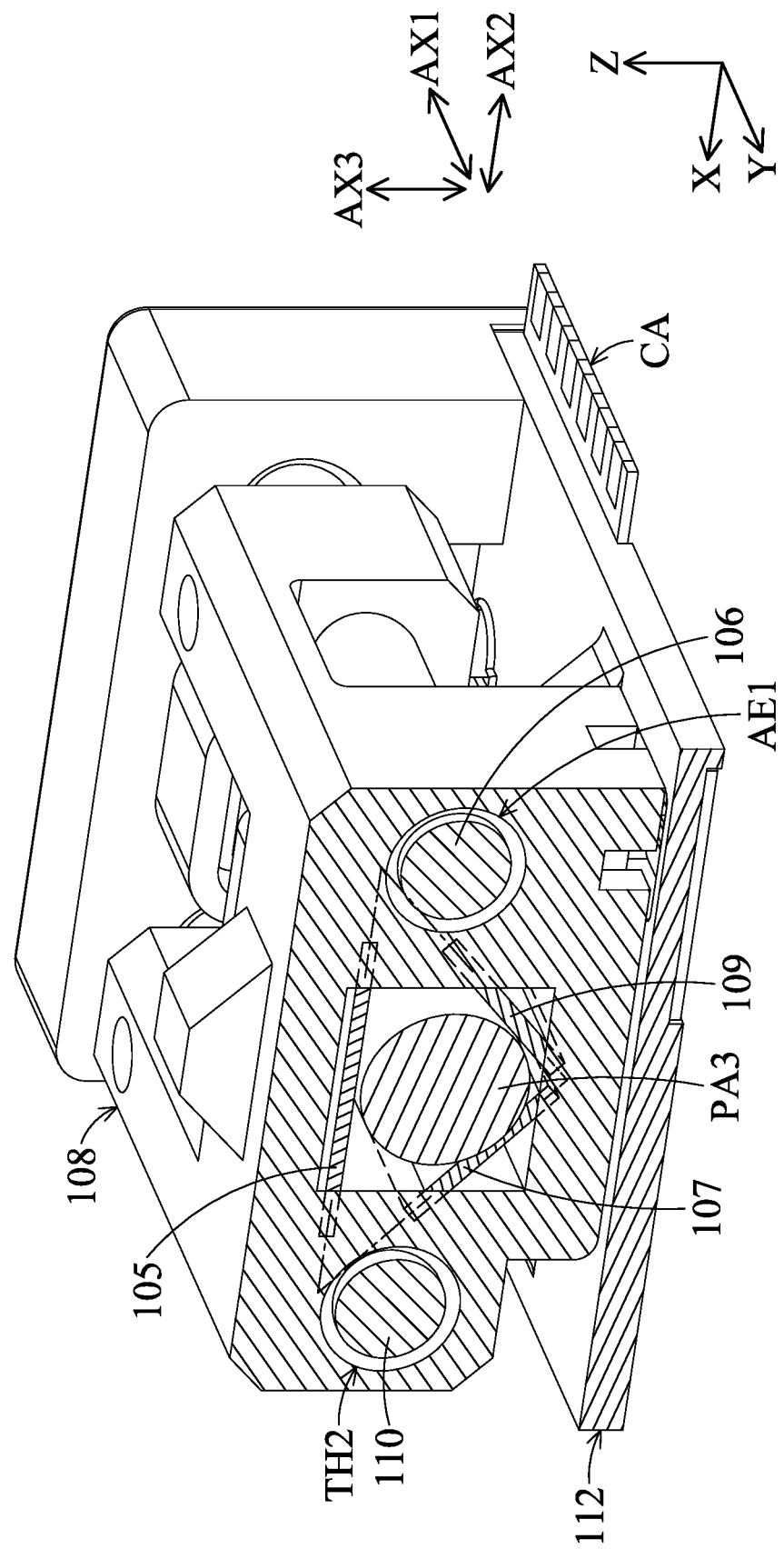
FIG. 13 is a cross-sectional view of a partial structure of the optical element driving mechanism 100 according to another embodiment of the present disclosure.

Please refer to FIG. 13, which is a cross-sectional view of a partial structure of the optical element driving mechanism 100 according to another embodiment of the present disclosure. In this embodiment, the movable assembly MA includes a first holding element 105, a second holding element 107 and a third holding element 109. The first holding element 105, the second holding element 107 and the third holding element 109 are made of metal.

When viewed along the first axis AX1, the first holding element 105 has a plate-shaped structure that extends along the second axis AX2. Both ends of the first holding element 105 are embedded in the movable part 108. When viewed along the first axis AX1, the second holding element 107 and the third holding element 109 have a plate-shaped structure, and the extending directions of the second holding element 107 and the third holding element 109 are not parallel to the second axis AX2 and the third axis AX3.

When viewed along the first axis AX1, both ends of the second holding element 107 are embedded in the movable part 108. When viewed along the first axis AX1, both ends of the third holding element 109 are embedded in the movable part 108. When viewed along the first axis AX1, the extending directions (extending lines) of the first holding element 105, the second holding element 107 and the third holding element 109 form a triangular shape.

Similar to the foregoing embodiments, the first holding element 105, the second holding element 107, and the third holding element 109 are embedded in the movable part 108 by insert molding technology. Based on such a structural configuration, the assembly procedure for the operator can be reduced, thereby increasing the production efficiency.

In conclusion, the present disclosure provides an optical element driving mechanism including a fixed assembly, a movable assembly and a driving assembly. The movable assembly is connected to an optical element, and the driving assembly drives the movable assembly to move with the optical element relative to the fixed assembly along a first axis. The driving assembly can be a piezoelectric assembly including a piezoelectric ceramic. Therefore, in contrast to the conventional driving mechanism composed of coils and magnets, the thrust of the optical element driving mechanism of the present disclosure can be increased more than threefold, so it can drive larger and heavier lenses.

In the present disclosure, the movable part 108 of the movable assembly MA has a U-shaped structure, and the first guiding rod 106 and the second guiding rod 110 pass through the movable part 108 to be fixed on the base 112 and the bottom cover 115, so that the movable part 108 can move back and forth along these two guiding rods. Based on such a structural design, it can be ensured that the movable part 108 does not have the problem of rotating during the movement.

In addition, in some embodiments, the bottom of one of the extending structures of the movable part 108 may be provided with a first magnetic element MG1, and the bottom plate 1120 may be provided with a second magnetic element MG2 correspondingly. Based on such a structural design, the magnetic attraction generated between the two magnetic elements (the magnets) can make the movable part 108 firmly lean against the second guiding rod 110, thereby stabilizing the movement of the movable part 108 along the first axis AX1.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism, comprising:
   a fixed assembly;
   a movable part, configured to be connected to an optical element and being movable relative to the fixed assembly; and
   a driving assembly, configured to drive the movable part to move along a first axis relative to the fixed assembly;
   wherein
   the movable assembly includes a movable part;
   the drive assembly includes a piezoelectric assembly configured to drive the movable part;
   the piezoelectric assembly is fixedly disposed on the fixed assembly, and the piezoelectric assembly includes a counterweight, a piezoelectric element and a driving member;
   the movable assembly further includes at least two holding elements;
   the at least two holding elements are configured to hold the driving member;
   the at least two holding elements include a first holding element and a second holding element;
   when viewed along the first axis, the first holding element has a plate-shaped structure extending along a second axis;
   the second axis is perpendicular to the first axis;
   the second holding element has a first end portion, a first connecting portion, a second connecting portion and a second end portion;
   the first connecting portion is connected between the first end portion and the second connecting portion;
   the second connecting portion is connected between the first connecting portion and the second end portion;
   the first end portion and the second end portion extend along a third axis;
   the third axis is perpendicular to the second axis and the first axis;
   extending directions of the first connecting portion and the second connecting portion are not parallel to the second axis and the third axis; and
   the first holding element, the first connecting portion and the second connecting portion are configured to be in contact with the driving member to hold the driving member.

2. The optical element driving mechanism as claimed in claim 1, wherein
   the piezoelectric element is fixedly connected between the counterweight and the driving member;
   the driving member has a long strip-shaped structure extending along the first axis;
   the driving member is made of a carbon material;
   the at least two holding elements and the driving member are disposed in a central opening of the movable part;
   the at least two holding elements are made of metal; and
   the piezoelectric element is configured to generate a vibration so that a friction force is generated between the driving member and the at least two holding elements to drive the movable part to move.

3. The optical element driving mechanism as claimed in claim 2, wherein
   the first holding element and the second holding element are made of metal;
   both ends of the first holding element are embedded in the movable part; and
   when viewed along the first axis, the second holding element has a V-shaped structure.

4. The optical element driving mechanism as claimed in claim 3, wherein
   the movable part forms a first V-shaped groove and a second V-shaped groove which are connected to the central opening and configured to accommodate the first end portion and the second end portion respectively;

a plurality of slope structures are formed in the first V-shaped groove and the second V-shaped groove and are configured to guide the corresponding first connecting portion and second connecting portion; and the optical element driving mechanism further includes a first adhesive element and a second adhesive element respectively disposed in the first V-shaped groove and the second V-shaped groove, configured to fix the first end portion and the second end portion.

5. The optical element driving mechanism as claimed in claim 4, wherein the first V-shaped groove has a first accommodating portion and a second accommodating portion;

the slope structures are formed between the first accommodating portion and the second accommodating portion;

when the second holding element is disposed in the first V-shaped groove, the second holding element does not protrude from the first accommodating portion;

the first accommodating portion is configured to accommodate the first adhesive element;

the first accommodating portion does not communicate with a first through hole of the movable part;

when viewed along the first axis, the first V-shaped groove is symmetrical to the second V-shaped groove;

when viewed along the first axis, the first end portion is symmetrical to the second end portion; and when viewed along the first axis, the first connecting portion is symmetrical to the second connecting portion.

6. The optical element driving mechanism as claimed in claim 2, wherein the at least two holding elements include a third holding element;

the first holding element, the second holding element and the third holding element are made of metal;

the second axis is perpendicular to the first axis;

both ends of the first holding element are embedded in the movable part;

when viewed along the first axis, the second holding element and the third holding element have a plate-shaped structure;

extending directions of the second holding element and the third holding element are not parallel to the second axis and a third axis;

the third axis is perpendicular to the second axis and the first axis;

when viewed along the first axis, both ends of the second holding element are embedded in the movable part;

when viewed along the first axis, both ends of the third holding element are embedded in the movable part; and when viewed along the first axis, extending directions of the first holding element, the second holding element and the third holding element form a triangular shape.

7. An optical element driving mechanism, comprising:
a fixed assembly;
a movable part, configured to be connected to an optical element and being movable relative to the fixed assembly; and
a driving assembly, configured to drive the movable part to move along a first axis relative to the fixed assembly; wherein
the movable assembly includes a movable part;
the drive assembly includes a piezoelectric assembly configured to drive the movable part;

the piezoelectric assembly is fixedly disposed on the fixed assembly, and the piezoelectric assembly includes a counterweight, a piezoelectric element and a driving member;

the piezoelectric element is fixedly connected between the counterweight and the driving member;

the driving member has a long strip-shaped structure extending along the first axis;

the driving member is made of a carbon material;

the movable assembly further includes at least two holding elements;

the at least two holding elements and the driving member are disposed in a central opening of the movable part;

the at least two holding elements are configured to hold the driving member;

the at least two holding elements are made of metal;

the piezoelectric element is configured to generate a vibration so that a friction force is generated between the driving member and the at least two holding elements to drive the movable part to move;

the fixed assembly includes a base;

the base has a bottom plate and a side body, and the side body is disposed on the bottom plate;

a first inserting hole and a second inserting hole are formed on the side body;

the optical element driving mechanism further includes a first guiding rod and a second guiding rod;

the first guiding rod and the second guiding rod extend along the first axis;

the first guiding rod and the second guiding rod pass through the movable part and are respectively inserted into the first inserting hole and the second inserting hole, so as to guide the movable part to move along the first axis relative to the base;

a central notch is further formed on the side body, located between the first inserting hole and a second inserting hole;

the base further has a positioning block disposed on the bottom plate;

a central through hole is formed on the positioning block, corresponding to the central notch;

the piezoelectric assembly is configured to pass through the central through hole and the movable part and then to be disposed in the central notch; and the piezoelectric assembly is configured to drive the movable part to move between the side body and the positioning block.

8. The optical element driving mechanism as claimed in claim 7, wherein the fixed assembly further includes a bottom cover fixedly connected to the base;

the base has a first engaging structure, and the bottom cover has a second engaging structure;

the first engaging structure is configured to engage with the second engaging structure so as to limit movement of the bottom cover relative to the base;

the positioning block is located between the side body and the bottom cover;

a third inserting hole and a fourth inserting hole is formed on the bottom cover, and the first guiding rod and the second guiding rod are respectively inserted into the third inserting hole and the fourth inserting hole;

a first gap is formed between the first guiding rod and the third inserting hole;

a second gap is formed between the second guiding rod and the fourth inserting hole;

the optical element driving mechanism further includes a first bonding element and a second bonding element; and the first bonding element and the second bonding element are respectively disposed in the first gap and the second gap and configured to respectively fix the first guiding rod and the second guiding rod.

9. The optical element driving mechanism as claimed in claim 8, wherein a first protruding structure is formed on the bottom cover and extends along the first axis toward the positioning block;

an accommodating notch is formed on the first protruding structure and is configured to accommodate the counterweight;

the counterweight is not in contact with the first protruding structure; and the optical element driving mechanism further includes a first adhesive element disposed in the accommodating notch and connected to the first protruding structure and the counterweight.

10. The optical element driving mechanism as claimed in claim 9, wherein the fixed assembly further includes an outer frame configured to frame the base and the bottom cover;

the bottom cover has an outer surface, and at least one second protruding structure is formed on the outer surface;

the at least one second protruding structure is engaged between the outer surface and the outer frame; and a central perforation is further formed on the bottom cover and penetrates the bottom cover along the first axis, so that an external positioning post is inserted into the central perforation to be in contact with the counterweight, and then the piezoelectric assembly is driven to insert itself into the central through hole and the central notch.

11. The optical element driving mechanism as claimed in claim 10, wherein the fixed assembly further includes a second elastic element and a third elastic element, each of which has a ring structure;

the second elastic element is fixedly disposed in the central notch and ensheathes one end of the driving element; and the third elastic element is tightly disposed in the central through hole and ensheathes the other end of the driving element.

12. The optical element driving mechanism as claimed in claim 11, wherein when viewed along a third axis, a portion of the second elastic element is exposed by the side body;

the third axis is perpendicular to the first axis;

the optical element driving mechanism further includes a bonding element disposed on the second elastic element and the side body, configured to affix the second elastic element to the central notch of the side body; and when viewed along the third axis, the bonding element overlaps a portion of the second elastic element.

13. The optical element driving mechanism as claimed in claim 12, wherein when viewed along a second axis, a length of the movable part along the first axis is not equal to a length of the driving member along the first axis;

the second axis is perpendicular to the first axis and the third axis; and when viewed along the second axis, the length of the movable part along the first axis is greater than the length of the driving member along the first axis.

14. The optical element driving mechanism as claimed in claim 13, wherein a first chamfer structure is formed on the positioning block and is connected to the central through hole;

the first chamfer structure is configured to guide the third elastic element to be installed in the central through hole;

the first chamfer structure faces the first protruding structure of the bottom cover; and the optical element driving mechanism further includes a second adhesive element disposed between the third elastic element and the first chamfer structure to affix the third elastic element to the positioning block.

15. The optical element driving mechanism as claimed in claim 14, wherein when viewed along the second axis, a first outer surface of the positioning block, a second outer surface of the driving member and a third outer surface of the third elastic element are coplanar.

16. The optical element driving mechanism as claimed in claim 10, wherein when viewed along a third axis, the movable part has a U-shaped structure;

the third axis is perpendicular to the first axis;

the movable part has a base structure, a first extending structure, a second extending structure, a third extending structure and a fourth extending structure;

the first extending structure to the fourth extending structure are extended from the base structure along the third axis;

the first guiding rod passes through a first through hole of the first extending structure and a third through hole of the third extending structure; and the second guiding rod passes through a second through hole of the second extending structure and a fourth through hole of the fourth extending structure.

17. The optical element driving mechanism as claimed in claim 16, wherein a size of the first through hole is equal to a size of a third through hole;

a size of the second through hole is equal to size of a fourth through hole;

the size of the third through hole is different from the size of the fourth through hole; and the size of the third through hole is smaller than the size of the fourth through hole.

18. The optical element driving mechanism as claimed in claim 17, wherein the optical element driving mechanism further includes a sensing assembly configured to sense a position of the movable part relative to the fixed assembly;

the sensing assembly includes a sensing element and a sensed element;

the sensed element is disposed on a bottom of the first extending structure, facing the circuit assembly;

the sensing element is disposed on the circuit assembly and is configured to sense changes in the magnetic field of the sensed element;

a length of the first extending structure along the third axis is different from a length of the third extending structure along the third axis;

the length of the first extending structure along the third axis is greater than the length of the third extending structure along the third axis;

the optical element driving mechanism further includes a first magnetic element and a second magnetic element;
the first magnetic element is disposed on a bottom of the fourth extending structure;
the second magnetic element is disposed on the base, corresponding to the first magnetic element;
the first magnetic element and the second magnetic element generate a magnetic attraction force to stabilize movement of the movable part along the first axis;
a length of the fourth extending structure along the third axis is different from a length of the second extending structure along the third axis; and
the length of the fourth extending structure along the third axis is greater than the length of the second extending structure along the third axis.

* * * * *